(12) United States Patent
Cho et al.

(10) Patent No.: US 8,797,370 B2
(45) Date of Patent: Aug. 5, 2014

(54) LIQUID CRYSTAL DISPLAY AND LOCAL DIMMING CONTROL METHOD THEREOF

(75) Inventors: Byoungchul Cho, Seoul (KR); Heejung Hong, Seoul (KR); Daeho Cho, Seoul (KR); Changkyun Park, Inchon (KR)

(73) Assignee: LG Display Co., Ltd., Seoul (KR)

( * ) Notice: Subject to any disclaimer, the term of this patent is extended or adjusted under 35 U.S.C. 154(b) by 281 days.

(21) Appl. No.: 13/267,573

(22) Filed: Oct. 6, 2011

(65) Prior Publication Data

US 2012/0086713 A1    Apr. 12, 2012

(30) Foreign Application Priority Data

Oct. 8, 2010 (KR) .................. 10-2010-0098186

(51) Int. Cl.
- *G09G 3/36* (2006.01)
- *G09G 5/10* (2006.01)
- *G09G 5/02* (2006.01)
- *G09G 3/00* (2006.01)

(52) U.S. Cl.
CPC ........ G09G 3/003 (2013.01); *G09G 2320/0646* (2013.01); *G09G 2360/16* (2013.01); G09G 3/3648 (2013.01); *G09G 2340/16* (2013.01)
USPC ............ 345/690; 345/694; 345/102; 345/204

(58) Field of Classification Search
CPC . G09G 3/003; G09G 3/3648; G09G 2360/16; G09G 2340/16; G09G 2320/0646
See application file for complete search history.

(56) References Cited

U.S. PATENT DOCUMENTS

| | | | | |
|---|---|---|---|---|
| 7,162,074 | B2 * | 1/2007 | Shibayama | 382/154 |
| 7,616,172 | B2 * | 11/2009 | Lin et al. | 345/8 |
| 2004/0174378 | A1 * | 9/2004 | Deering | 345/611 |
| 2004/0189565 | A1 * | 9/2004 | Someya | 345/87 |
| 2005/0001935 | A1 * | 1/2005 | Kiuchi et al. | 348/607 |
| 2006/0038837 | A1 * | 2/2006 | Hong | 345/691 |
| 2007/0120807 | A1 * | 5/2007 | Bai et al. | 345/102 |
| 2007/0188602 | A1 * | 8/2007 | Cowan et al. | 348/53 |
| 2007/0216828 | A1 * | 9/2007 | Jacobs | 349/64 |
| 2007/0242068 | A1 * | 10/2007 | Han et al. | 345/427 |
| 2007/0296673 | A1 * | 12/2007 | Kang et al. | 345/92 |
| 2008/0042927 | A1 * | 2/2008 | Jung et al. | 345/39 |
| 2008/0252666 | A1 * | 10/2008 | Chen et al. | 345/690 |
| 2009/0009508 | A1 * | 1/2009 | Koo et al. | 345/214 |
| 2009/0015601 | A1 * | 1/2009 | Kim | 345/690 |
| 2009/0015602 | A1 * | 1/2009 | Rumreich et al. | 345/690 |
| 2009/0109247 | A1 * | 4/2009 | Kimura | 345/690 |
| 2009/0167639 | A1 * | 7/2009 | Casner et al. | 345/58 |
| 2009/0179850 | A1 * | 7/2009 | Chen et al. | 345/102 |
| 2009/0303171 | A1 * | 12/2009 | Chang et al. | 345/102 |

(Continued)

*Primary Examiner* — Amare Mengistu
*Assistant Examiner* — Crystal A Mathews
(74) *Attorney, Agent, or Firm* — Brinks Gilson & Lione (57) ABSTRACT

A liquid crystal display and a local dimming control method thereof are discussed. The liquid crystal display includes a liquid crystal display panel selectively displaying a 2D image and a 3D image in response to a mode signal, a backlight unit including a plurality of light sources, a backlight driving circuit individually driving a plurality of previously determined blocks each including the light sources based on a dimming value of each block, and a local dimming control circuit, that calculates a pixel gain value based on a dimming value of each block in a first frame, applies the pixel gain value to a data compensation for a second frame, which is arranged later than the first frame, and varies a time point when the pixel gain value for the data compensation is applied in response to the mode signal.

7 Claims, 10 Drawing Sheets

(56) References Cited

U.S. PATENT DOCUMENTS

| | | | |
|---|---|---|---|
| 2009/0315977 A1* | 12/2009 | Jung et al. | 348/42 |
| 2009/0322796 A1* | 12/2009 | Yoshida | 345/690 |
| 2010/0002295 A1* | 1/2010 | Kimpe | 359/465 |
| 2010/0039503 A1* | 2/2010 | Lin et al. | 348/51 |
| 2010/0066752 A1* | 3/2010 | Watanuki | 345/589 |
| 2010/0066820 A1* | 3/2010 | Park et al. | 348/53 |
| 2010/0073768 A1* | 3/2010 | Kim et al. | 359/463 |
| 2010/0085374 A1* | 4/2010 | Lee et al. | 345/589 |
| 2010/0156777 A1* | 6/2010 | Kang et al. | 345/102 |
| 2010/0238274 A1* | 9/2010 | Kim et al. | 348/51 |
| 2010/0289974 A1* | 11/2010 | Kim et al. | 349/15 |
| 2010/0295879 A1* | 11/2010 | Tanaka et al. | 345/690 |
| 2010/0309381 A1* | 12/2010 | Nakagawa et al. | 348/705 |
| 2011/0007132 A1* | 1/2011 | Redmann et al. | 348/42 |
| 2011/0037829 A1* | 2/2011 | Hata | 348/43 |
| 2011/0038042 A1* | 2/2011 | Redmann et al. | 359/462 |
| 2011/0090308 A1* | 4/2011 | Chen et al. | 348/43 |
| 2011/0096146 A1* | 4/2011 | Hulyalkar et al. | 348/43 |
| 2011/0109733 A1* | 5/2011 | Kim et al. | 348/56 |
| 2011/0115889 A1* | 5/2011 | Kim et al. | 348/56 |
| 2011/0122238 A1* | 5/2011 | Hulvey et al. | 348/56 |
| 2011/0128302 A1* | 6/2011 | Cho et al. | 345/690 |
| 2011/0141002 A1* | 6/2011 | Kim | 345/102 |
| 2011/0141090 A1* | 6/2011 | Hong et al. | 345/211 |
| 2011/0141154 A1* | 6/2011 | Ahn et al. | 345/690 |
| 2011/0141244 A1* | 6/2011 | Vos et al. | 348/51 |
| 2011/0242094 A1* | 10/2011 | Kawahara | 345/419 |
| 2011/0273439 A1* | 11/2011 | Son et al. | 345/419 |
| 2011/0292184 A1* | 12/2011 | de Greef | 348/51 |
| 2011/0298905 A1* | 12/2011 | Kim et al. | 348/54 |
| 2012/0007895 A1* | 1/2012 | Kim et al. | 345/690 |
| 2012/0013601 A1* | 1/2012 | Park et al. | 345/419 |
| 2012/0235989 A1* | 9/2012 | Cho et al. | 345/419 |

* cited by examiner

(RELATED ART)

| BLK[1, 1] | BLK[1, 2] | BLK[1, 3] | BLK[1, 4] | ... | BLK[1, m] |
|---|---|---|---|---|---|
| BLK[2, 1] | | | | | |
| BLK[3, 1] | | | .... | | |
| ... | | | | ... | |
| BLK[n, 1] | | | | | BLK[n, m] |

LIQUID CRYSTAL DISPLAY AND LOCAL DIMMING CONTROL METHOD THEREOF

This application claims the benefit of the Korean Patent Application No. 10-2010-0098186, filed in Korea on Oct. 8, 2010, which are hereby incorporated by reference as if fully set forth herein.

BACKGROUND

1. Field of the Invention

Embodiments of the invention relate to a liquid crystal display and a local dimming control method thereof.

2. Discussion of the Related Art

Liquid crystal displays have been widely used in personal computers such as notebook PCs, office automation equipments, audio/video equipments, interior/outdoor advertising display devices, and the like. The liquid crystal displays display an image using a thin film transistor (TFT) as a switching element. A backlit liquid crystal display occupying most of the liquid crystal displays controls an electric field applied to a liquid crystal layer and modulates light coming from a backlight unit, thereby displaying an image.

The image quality of the liquid crystal display depends on its contrast characteristic. Improvements to the contrast characteristic are limited using only a method for controlling a data voltage applied to the liquid crystal layer to modulate a light transmittance of the liquid crystal layer. As a solution, a backlight dimming method has been proposed so as to improve the contrast characteristic. The backlight dimming method adjusts a luminance of a backlight unit depending on an image displayed on the liquid crystal display. The backlight dimming method includes a global dimming method for adjusting a luminance of the entire display surface of the liquid crystal display and a local dimming method for locally controlling a luminance of the display surface of the liquid crystal display. The global dimming method can improve a dynamic contrast ratio measured between two adjacent frames. The local dimming method can locally control the luminance of the display surface of the liquid crystal display within one frame, thereby improving a static contrast ratio which is difficult to improve using the global dimming method.

A liquid crystal display capable of selectively implementing a two-dimensional (2D) image and a three-dimensional (3D) image has been recently developed based on the development of various image processing techniques. The application of the local dimming method has been considered to implement the 3D image, so as to improve the contrast ratio and reduce the power consumption.

In a related art local dimming technique, the backlight unit is divided into a plurality of blocks. The local dimming technique adjusts a dimming value of each of the plurality of blocks, thereby increasing a luminance of the backlight unit belonging to the block displaying a bright image and reducing a luminance of the backlight unit belonging to the block displaying a dark image. A modulation of pixel data may compensate for a deficiency of the luminance of the backlight unit resulting from the local dimming technique. The modulation of the pixel data is performed based on a pixel gain value obtained through the result of an analysis of an amount of light of the backlight unit of each block.

Figure 1:
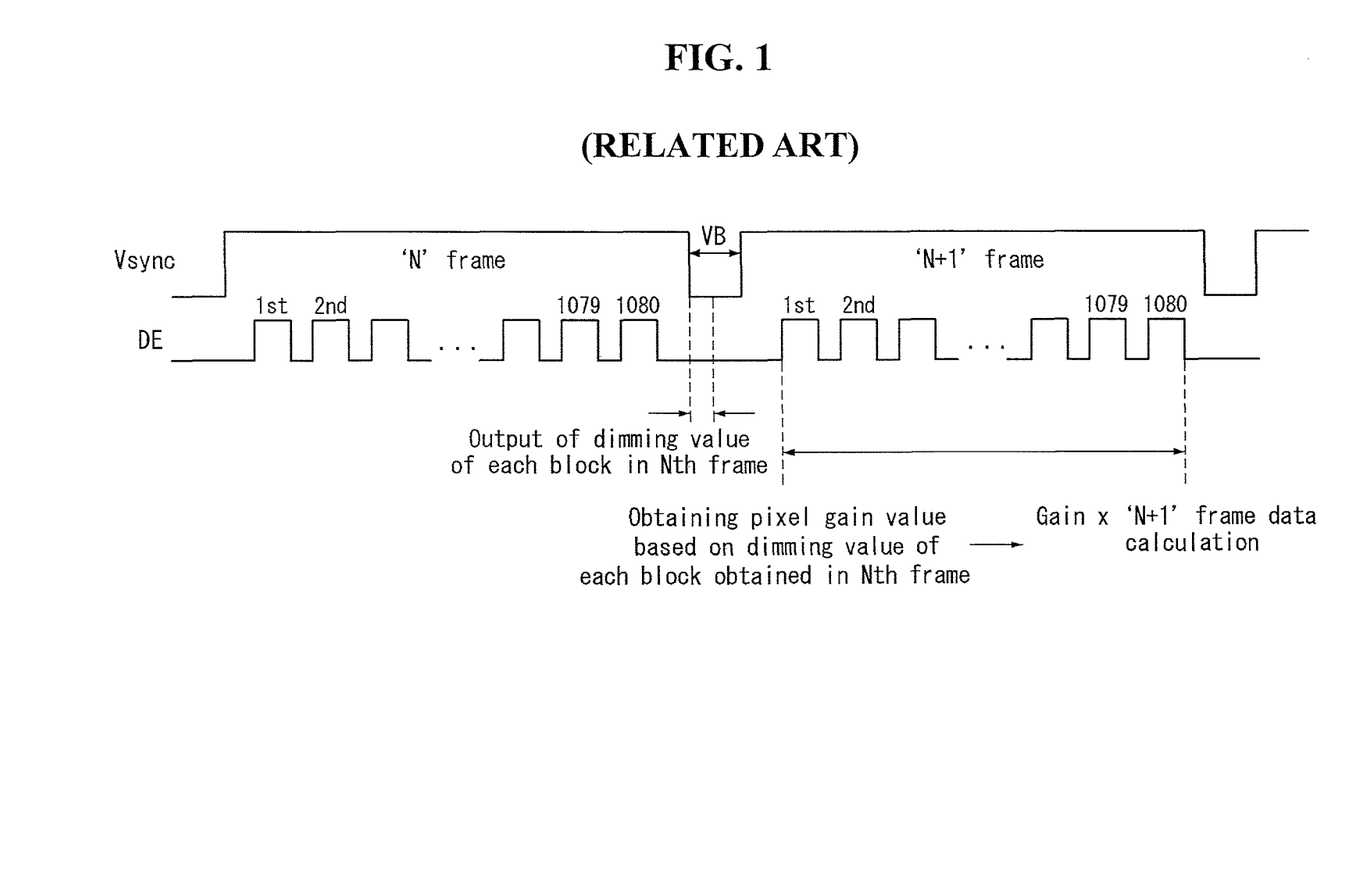
FIG. 1 illustrates a compensation for pixel data in a related art local dimming technique.

FIG. 1 illustrates a compensation for pixel data in the related art local dimming technique. As shown in FIG. 1, a dimming value of each block in an Nth frame is output in a vertical blank period VB between the Nth frame and an (N+1)th frame, where N is a positive integer. A pixel gain value of the Nth frame is obtained based on the dimming value of each block of the Nth frame, and then data to be displayed in the (N+1)th frame is compensated using the pixel gain value of the Nth frame. In FIG. 1, Vsync denotes a vertical sync signal, and DE denotes a data enable.

The related art local dimming technique is applied to the implementation of the 2D image without difficulty. However, when the related art local dimming technique is applied to the implementation of the 3D image, the following problems are generated.

There are known several methods for implementing the 3D image. Out of the several methods, a liquid crystal shutter glasses method alternately displays left eye images and right eye images on a display element in units of frame and opens or closes left and right eye shutters of liquid crystal shutter glasses in synchronization with a display timing, thereby implementing the 3D image. The liquid crystal shutter glasses open only the left eye shutter during the frames which display the left eye images and open only the right eye shutter during the frames in which display the right eye images, thereby making binocular disparity in a time divisional manner. In particular, a liquid crystal display using the liquid crystal shutter glasses method has been recently driven in a method (called 'LBRB' method), in which a black frame is inserted between adjacent left and right eye data frames, so as to solve an image tailing phenomenon resulting from a response characteristic delay of liquid crystals. In the 'LBRB' method, 'L' indicates the left eye data frame, 'R' indicates the right eye data frame, and 'B' denotes the black frame.

Figure 2:
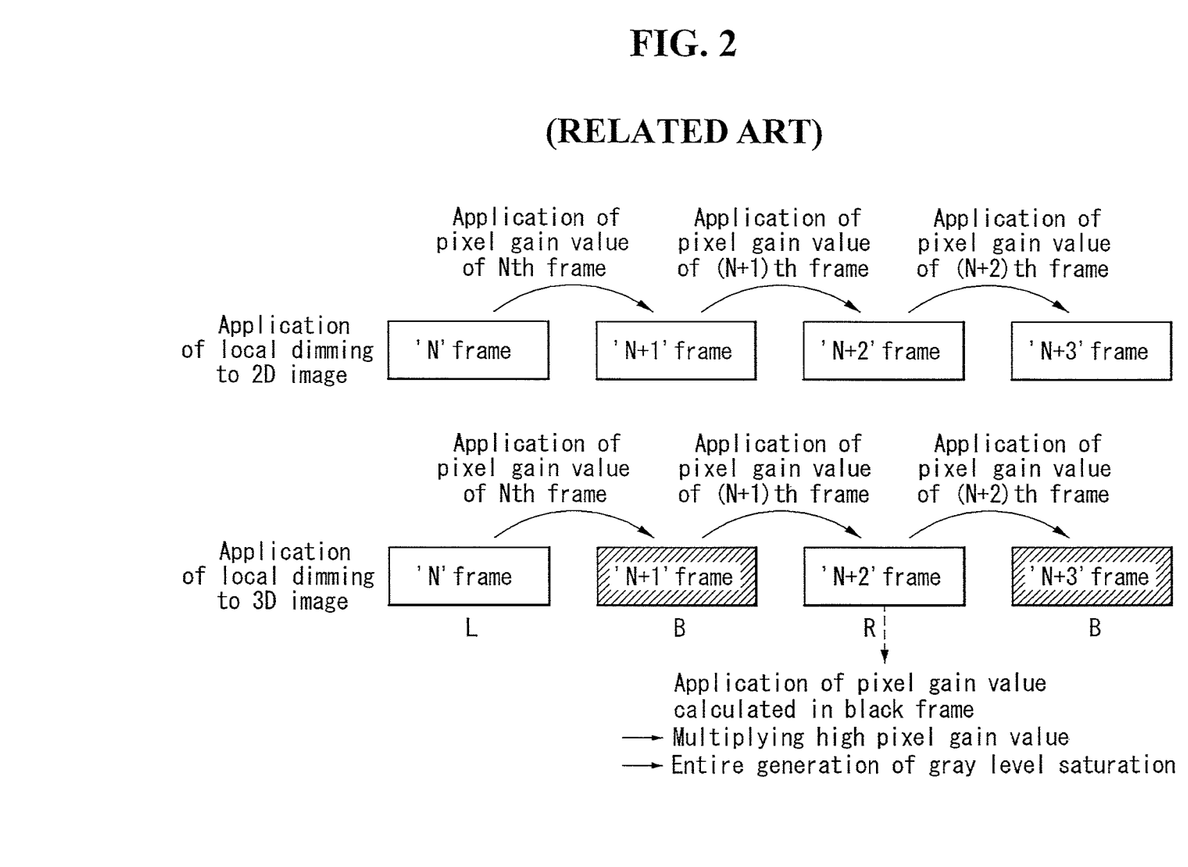
FIG. 2 illustrates a reason why a gray level saturation is generated when a related art local dimming technique is applied to the implementation of a 3D image.

However, as shown in FIG. 2, when the related art local dimming technique is applied to the implementation of the 3D image, a gray level saturation is generated in data to be displayed in the left or right eye data frame L/R. This is because a pixel gain value calculated in the black frame B, which is a frame just prior to the left or right eye data frame L/R, is applied to the data to be displayed in the left or right eye data frame L/R. The pixel gain value is determined based on data required to allow a luminance obtained from a total amount of light (i.e., an amount of light in dimming) reaching a corresponding pixel in the local dimming using a dimming value of a block including the corresponding pixel to be equal to a luminance obtained from a total amount of light (i.e., an amount of light in non-dimming) reaching the corresponding pixel in local non-dimming. The pixel gain value is calculated by dividing the amount of light in the non-dimming having a fixed value by the amount of light in the dimming. Therefore, when the amount of light in the dimming is less than the amount of light in the non-dimming, the pixel gain value of the corresponding pixel increases. The pixel gain value calculated in the black frame B increases because of the small amount of light in the dimming. Because an upward modulation width of data increases as the pixel gain value increases, the gray level saturation, is generated in a high gray level section. In other words, in the related art local dimming technique applied to the implementation of the 3D image in the same manner as the implementation of the 2D image, a pixel gain value of a current frame is calculated based on a dimming value obtained in the current frame, and the pixel gain value is used to compensate for data of the next frame. Therefore, the pixel gain value applied to the next frame is not proper in the 3D mode having a little correlation between the adjacent frames (for example, the frames B and L or the frames B and R). The gray level saturation increases a 3D crosstalk and reduces the display quality.

BRIEF SUMMARY

Embodiments of the invention provide a liquid crystal display and a local dimming control method thereof capable of improving the display quality when implementing a 2D image and a 3D image.

In one aspect, there is a liquid crystal display including a liquid crystal display panel configured to selectively display a 2D image and a 3D image in response to a mode signal, a backlight unit including a plurality of light sources, the backlight unit providing light to the liquid crystal display panel, a backlight driving circuit configured to individually drive a plurality of previously determined blocks each including the light sources based on a dimming value of each of the blocks, and a local dimming control circuit configured to calculate a pixel gain value based on a dimming value of each block in a first frame, apply the pixel gain value to a data compensation for a second frame, which is arranged later than the first frame, and vary a time point when the pixel gain value for the data compensation is applied in response to the mode signal.

In another aspect, there is a local dimming control method of a liquid crystal display including a liquid crystal display panel selectively displaying a 2D image and a 3D image in response to a mode signal and a backlight unit, which includes a plurality of light sources and provides light to the liquid crystal display panel, the local dimming control method comprising the steps of (A) individually driving a plurality of previously determined blocks each including the light sources based on a dimming value of each of the blocks, and (B) calculating a pixel gain value based on a dimming value of each block in a first frame, applying the pixel gain value to a data compensation for a second frame, which is arranged later than the first frame, and varying time point when the pixel gain value for the data compensation is applied in response to the mode signal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE DRAWINGS AND THE PRESENTLY PREFERRED EMBODIMENTS

Reference will now be made in detail embodiments of the invention examples of which are illustrated in the accompanying drawings.

Figure 3:
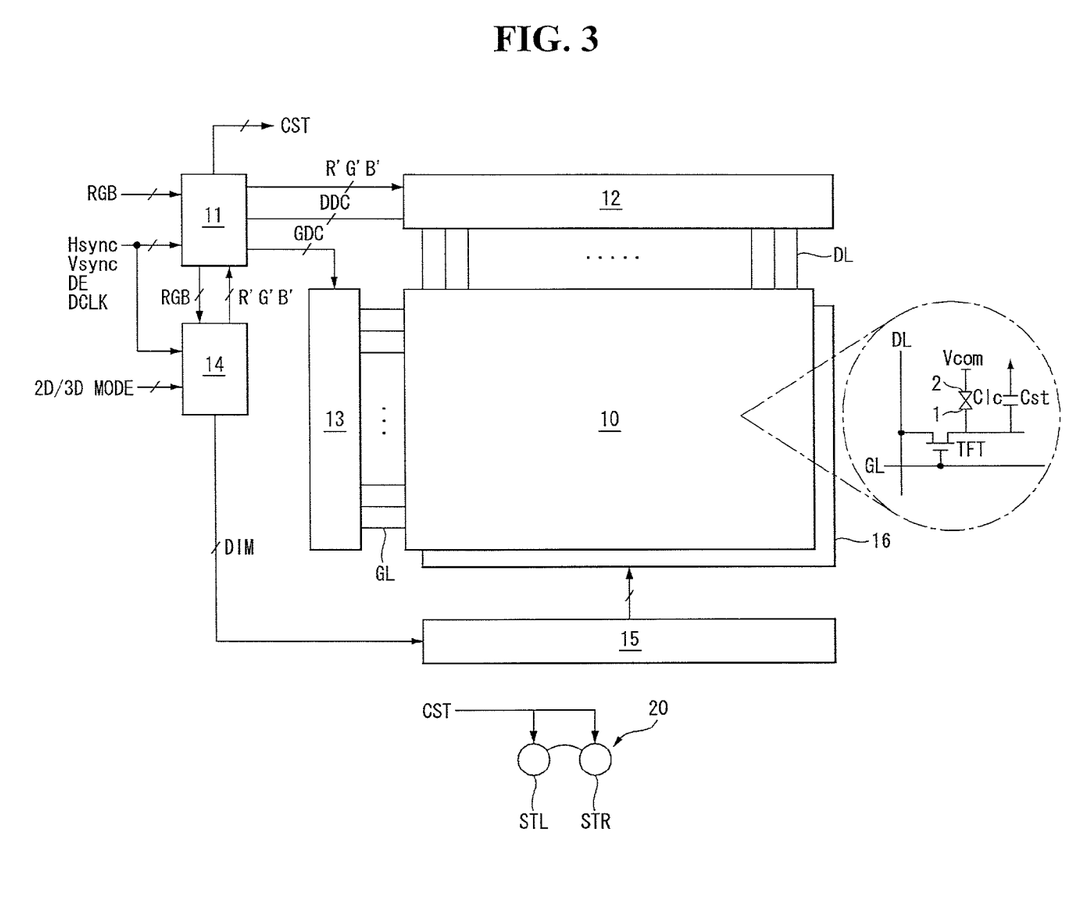
FIG. 3 illustrates a liquid crystal display according to an exemplary embodiment of the invention.

FIG. 3 illustrates a liquid crystal display according to an example embodiment of the invention. As shown in FIG. 3, a liquid crystal display according to an example embodiment of the invention includes a liquid crystal display panel 10, a timing controller 11, a data driving circuit 12, a gate driving circuit 13, a local dimming control circuit 14, a backlight driving circuit 15, a backlight unit 16, and liquid crystal shutter glasses 20. The liquid crystal display according to the embodiment of the invention selects one of a 2D mode and a 3D mode in response to a mode signal 2D/3D MODE received from a user interface (not shown).

The liquid crystal display panel 10 includes an upper glass substrate, a lower glass substrate, and a liquid crystal layer between the upper and lower glass substrates. A plurality of data lines DL and a plurality of gate lines GL cross one another on the lower glass substrate of the liquid crystal display panel 10. A plurality of liquid crystal cells Clc are arranged on the liquid crystal display panel 10 in a matrix form in accordance with a crossing structure of the data lines DL and the gate lines GL. Each of the plurality of liquid crystal cells Clc includes a thin film transistor TFT, a pixel electrode 1 connected to the thin film transistor TFT, a storage capacitor Cst, and the like.

Black matrixes, color filters, and common electrodes 2 are formed on the upper glass substrate of the liquid crystal display panel 10. In a vertical electric field driving manner such as a twisted nematic (TN) mode and a vertical alignment (VA) mode, the common electrodes 2 are formed on the upper glass substrate. In a horizontal electric field driving manner such as an in-plane switching (IPS) mode and a fringe field switching (FFS) mode, the common electrodes 2 are formed on the lower glass substrate along with the pixel electrodes 1. Each of the plurality of liquid crystal cells Clc includes a red (R) liquid crystal cell for displaying a red image, a green (G) liquid crystal cell for displaying a green image, and a blue (B) liquid crystal cell for displaying a blue image. The R, G, and B liquid crystal cells form a unit pixel. Polarizing plates are respectively attached to the upper and lower glass substrates of the liquid crystal display panel 10. Alignment layers for setting a pre-tilt angle of liquid crystals are respectively formed on the inner surfaces contacting the liquid crystals in the upper and lower glass substrates.

The timing controller 11 supplies digital video data RGB received from a system board (not shown), on which a video source is mounted, to the local dimming control circuit 14 and supplies a modulated data R'G'B' compensated by the local dimming control circuit 14 to the data driving circuit 12. In the following description, the digital video data RGB indicates data for implementing a 2D image in the 2D mode, and indicates left eye data, right eye data, and black data for implementing a 3D image in the 3D mode.

The timing controller 11 receives timing signals Vsync, Hsync, DE, and DCLK from the system board and generates a data timing control signal DDC and a gate timing control signal GDC for respectively controlling operation timings of the data driving circuit 12 and the gate driving circuit 13 based on the timing signals Vsync, Hsync, DE, and DCLK. The timing controller 11 may differently operate in response to the mode signal 2D/3D MODE. In the 2D mode, the timing controller 11 inserts an interpolation frame between frames of a 2D image signal input at a frame frequency of 60 Hz and multiplies the frequency of the data timing control signal DDC by the frequency of the gate timing control signal GDC. Hence, the timing controller 11 can control an operation of the data driving unit 12 and an operation of the gate driving unit 13 at a frame frequency of (60×J) Hz, where J is a positive integer equal to or greater than 2. In the 3D mode, the timing controller 11 inserts a black frame between frames of left and right eye data input at a frame frequency of 60 Hz and multiplies the frequency of the data timing control signal DDC by the frequency of the gate timing control signal GDC. Hence, the timing controller 11 can control an operation of the data driving unit 12 and an operation of the gate driving unit 13 at a frame frequency of (60×K) Hz, where K is a positive integer equal to or greater than 4. Further, in the 3D mode, the timing controller 11 generates a shutter control signal CST and controls an operation of the liquid crystal shutter glasses 20 in response to the shutter control signal CST.

The data driving circuit 12 includes a plurality of data driver integrated circuits (ICs). Each of the data driver ICs includes a shift register for sampling clocks, a register for temporarily storing input data, a latch that stores data corresponding to each line in response to the clocks received from the shift register and simultaneously outputs the data corresponding to each line, a digital-to-analog converter (DAC) for selecting positive and negative gamma voltages based on a gamma reference voltage corresponding to the digital data received from the latch, a multiplexer for selecting the data lines DL receiving analog data converted from the positive and negative gamma voltages, an output buffer connected between the multiplexer and the data lines DL, and the like. The data driving circuit 12 latches the modulated data R'G'B' under the control of the timing controller 11 and converts the latched modulated data R'G'B' into positive and negative analog data voltages using positive and negative gamma compensation voltages. The data driving circuit 12 then supplies the positive and negative analog data voltages to the data lines DL.

The gate driving circuit 13 includes a plurality of gate driver ICs. Each of the gate driver ICs includes a shift register, a level shifter for converting an output signal of the shift register into a swing width suitable for a TFT drive of the liquid crystal cells, an output buffer, and the like. The gate driving circuit 13 sequentially outputs a gate pulse (or a scan pulse) under the control of the timing controller 11 and supplies the gate pulse to the gate lines GL. Hence, a horizontal line to receive the data voltage is selected. The gate driving circuit 13 may be directly formed on the lower glass substrate of the liquid crystal display panel 10 through a gate-in-panel (GIP) process. The level shifter may be mounted on a control board (not shown) along with the timing controller 11.

The local dimming control circuit 14 analyzes the digital video data RGB received from the timing controller 11 and obtains a representative value of each of a plurality of blocks divided from the backlight unit 16. The local dimming control circuit 14 determines a dimming value DIM of each block for controlling a plurality of light sources of the backlight unit 16 based on the representative value of each block. The local dimming control circuit 14 calculates a pixel gain value compensating for a luminance reduction resulting from the dimming value DIM of each block and then compensates for the digital video data RGB based on the pixel gain value, thereby generating modulated data R'G'B'. The local dimming control circuit 14 applies the pixel gain value for the data compensation at a different time point in response to the mode signal 2D/3D MODE. More specifically, in the 2D mode, the local dimming control circuit 14 calculates a pixel gain value in an (N+1)th frame based on a dimming value DIM of each block obtained in an Nth frame, where N is a positive integer. Further, in the 2D mode, the local dimming control circuit 14 applies the pixel gain value of the (N+1)th frame to the data compensation for the (N+1)th frame. In the 3D mode, the local dimming control circuit 14 delays the dimming value DIM of each block obtained in the Nth frame by predetermined periods, and then calculates a pixel gain value in an (N+4)th frame based on the delayed dimming value DIM of each block. Further, in the 3D mode, the local dimming control circuit 14 applies the pixel gain value of the (N+4)th frame to the data compensation for the (N+4)th frame. The local dimming control circuit 14 may be mounted inside the timing controller 11.

The backlight driving circuit 15 drives the light sources belonging to each block using a pulse width modulation (PWM) signal having a varying duty ratio based on the dimming value DIM of each block received from the local dimming control circuit 14. Turn-on times of the light sources are differently controlled based on the duty ratio of the PWM signal.

The backlight unit 16 including the plurality of light sources provides light to the liquid crystal display panel 10. A surface light source as the backlight unit 16 is divided into the plurality of blocks in a matrix form. The backlight unit 16 may be implemented as one of an edge type backlight unit and a direct type backlight unit. In the direct type backlight unit 16, a plurality of optical sheets and a diffusion plate are stacked under the liquid crystal display panel 10, and the plurality of light sources are positioned under the diffusion plate. In the edge type backlight unit 16, a plurality of optical sheets and a light guide plate are stacked under the liquid crystal display panel 10, and the plurality of light sources are positioned at the sides of the light guide plate. The plurality of light sources of the backlight unit 16 may be implemented as point light sources such as a light emitting diode (LED).

The liquid crystal shutter glasses 20 are driven in the 3D mode. The liquid crystal shutter glasses 20 include a left eye shutter STL and a right eye shutter STR which are separately controlled electrically. Each of the left eye shutter STL and the right eye shutter STR includes a first transparent substrate, a first transparent electrode formed on the first transparent substrate, a second transparent substrate, a second transparent electrode formed on the second transparent substrate, and a liquid crystal layer interposed between the first and second transparent substrates. A reference voltage is supplied to the first transparent electrode, and an ON or OFF voltage is supplied to the second transparent electrode. When the ON voltage is supplied to the second transparent electrode, each of the left and right eye shutters STL and STR transmits light from the liquid crystal display panel 10 in response to the shutter control signal CST. On the other hand, when the OFF voltage is supplied to the second transparent electrode, each of the left and right eye shutters STL and STR blocks the light from the liquid crystal display panel 10. The liquid crystal shutter glasses 20 open only the left eye shutter STL during frames, in which the left eye data is displayed, and open only the right eye shutter STR during frames, in which the right eye data is displayed, thereby making binocular disparity in a time division manner.

Figure 4:
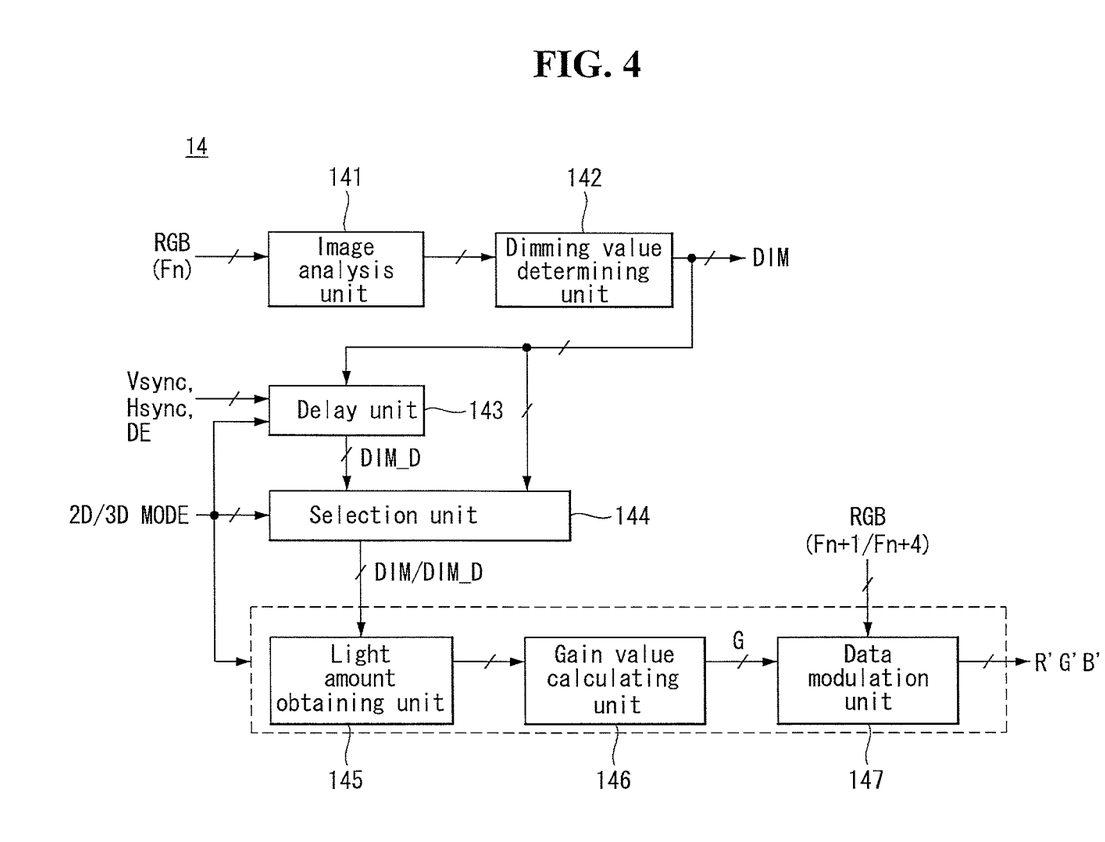
FIG. 4 illustrates an exemplary configuration of a local dimming control circuit.

FIG. 4 illustrates an exemplary configuration of the local dimming control circuit 14.

As shown in FIG. 4, the local dimming control circuit 14 includes an image analysis unit 141, a dimming value determining unit 142, a delay unit 143, a selection unit 144, a light amount obtaining unit 145, a gain value calculating unit 146, and a data modulation unit 147.

Figure 5:
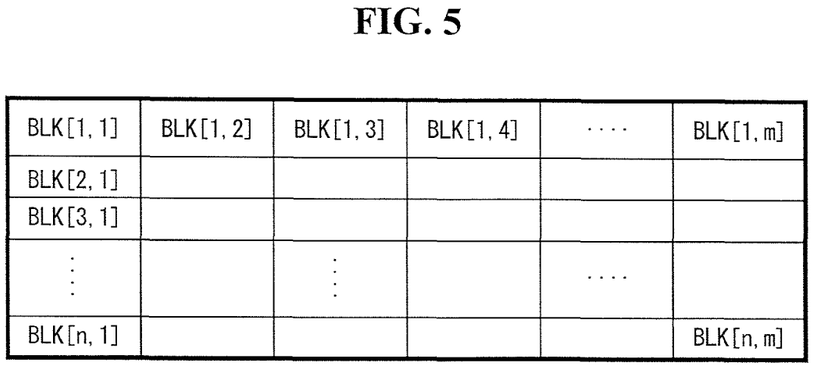
FIG. 5 illustrates an example of dividing a surface light source into a plurality of blocks for achieving a local dimming method.

As shown in FIG. 5, the image analysis unit 141 analyzes the digital video data RGB assigned to an Nth frame in each of a plurality of virtual blocks BLK[1,1] to BLK[n,m], which are divided from a display surface of the liquid crystal display panel 10 in a matrix form, to obtain a representative value of each of the blocks BLK[1,1] to BLK[n,m]. Additionally, the representative value of each block may be calculated by obtaining a maximum gray level from the digital video data RGB of pixel included in a corresponding block and dividing a sum of the maximum gray levels of the corresponding block by the number of pixels included in the corresponding block.

Figure 7:
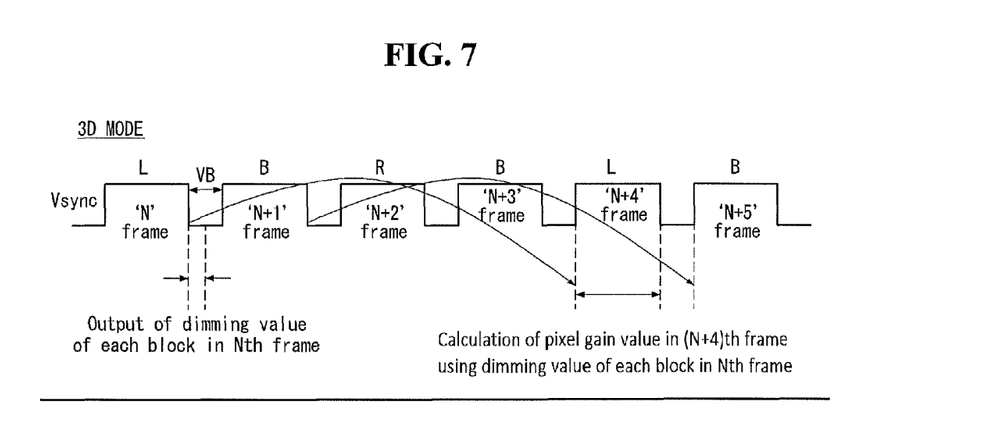
FIG. 7 illustrates a timing when a dimming value output, a pixel gain value calculation, and a data modulation are implemented in a 3D mode.
Figure 8:
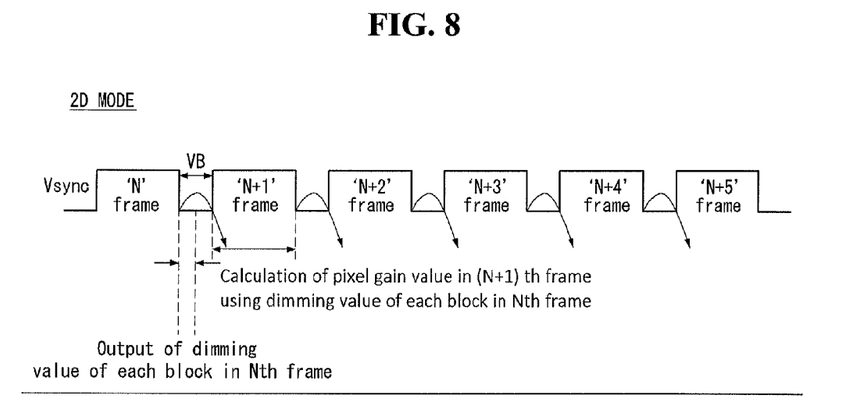
FIG. 8 illustrates a timing when a dimming value output, a pixel gain value calculation, and a data modulation are implemented in a 2D mode.

The dimming value determining unit 142 maps the representative value of each block received from the image analysis unit 141 to a previously set dimming curve and determines the dimming value DIM of each block. The dimming curve may be implemented as a lookup table. The dimming value DIM of each block may be proportional to the representative value of each block. As shown in FIGS. 7 and 8, the dimming value determining unit 142 outputs the dimming value DIM of each block of the Nth frame in a vertical blank period VB between the adjacent frames.

In the 3D mode, the delay unit 143 delays the dimming value DIM of each block received from the dimming value determining unit 142 by predetermined periods and outputs the delayed dimming value DIM_D of each block. As an operation corresponding to the 'LBRB' method for implementing the 3D image, the delay unit 143 counts the timing signals such as the vertical sync signal Vsync, the horizontal sync signal Hsync, and the data enable DE and delays the dimming value DIM of each block by three frames based on the result of a count. In the 2D mode, the delay unit 143 bypasses the dimming value DIM of each block received from the dimming value determining unit 142 without delaying periods.

The selection unit 144 selectively outputs the delayed dimming value DIM_D of each block or the bypassed dimming value DIM of each block received from the delay unit 143 in response to the mode signal 2D/3D MODE.

Figure 6:
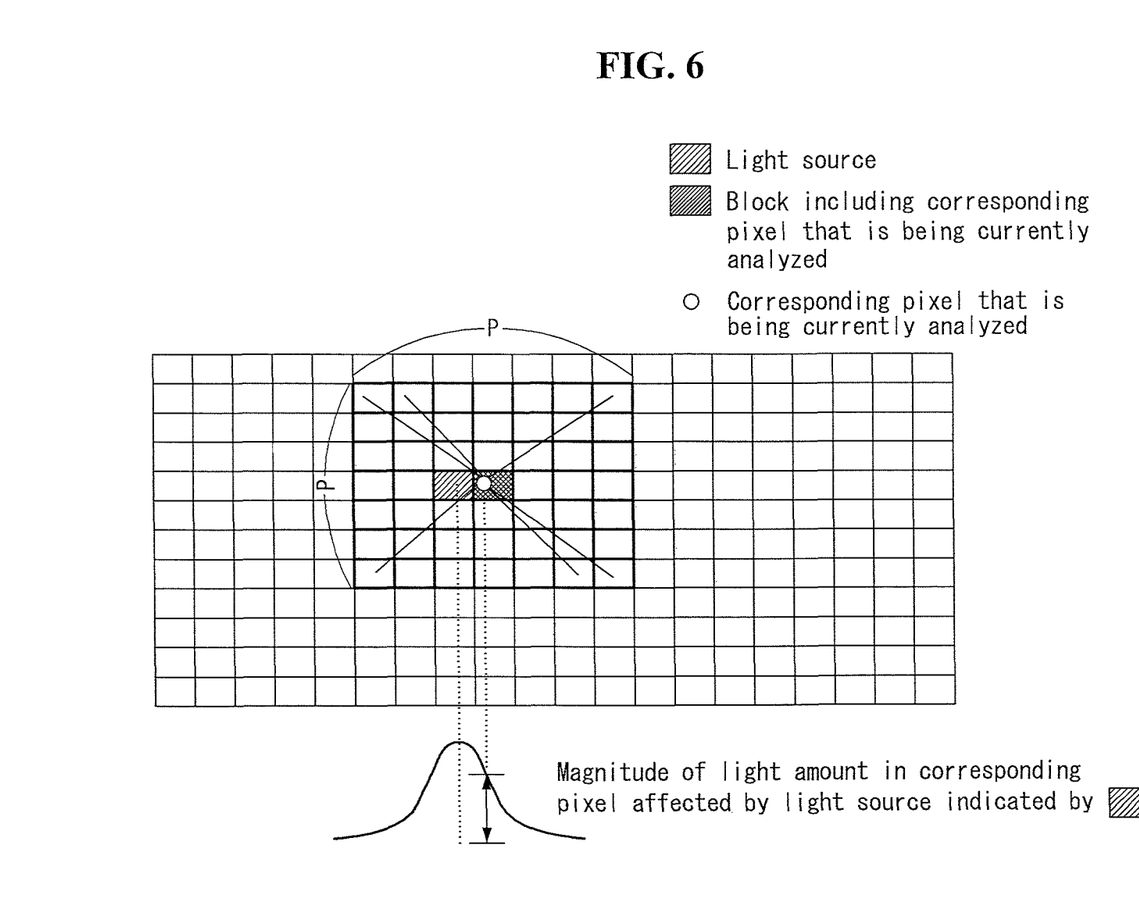
FIG. 6 illustrates an analysis area of size P×P surrounding a block including a corresponding pixel, where P is the number of blocks.

In the 3D mode, the light amount obtaining unit 145 obtains an amount of light (i.e., the amount of light in the non-dimming having a fixed maximum value) reaching each pixel in local non-dimming and an amount of light (i.e., the amount of light in the dimming) reaching each pixel in the local dimming using the delayed dimming value DIM_D of each block. In the 2D mode, the light amount obtaining unit 145 obtains an amount of light (i.e., the amount of light in the non-dimming having a fixed maximum value) reaching each pixel in local non-dimming and an amount of light (i.e., the amount of light in the dimming) reaching each pixel in the local dimming using the bypassed dimming value DIM of each block. The amount of light in the non-dimming indicates a total amount of light reaching a corresponding pixel when all of the light sources of the backlight unit 16 are turned on at a maximum brightness. As shown in FIG. 6, the amount of light in the dimming indicates a total amount of light reaching a corresponding pixel in an analysis area of size P×P surrounding a block including the corresponding pixel in the local dimming in a state where the block is positioned in the middle of the analysis area, where P indicates the number of blocks and is an odd number equal to or greater than 3. In other words, the amount of light in the dimming is determined by the delayed dimming value DIM_D or the bypassed dimming value DIM of the blocks positioned inside the analysis area.

As shown in FIG. 7, in the 3D mode, the gain value calculating unit 146 calculates a pixel gain value of the (N+4)th frame for each pixel based on the amount of light in the non-dimming and the amount of light in the dimming received from the light amount obtaining unit 145. As shown in FIG. 8, in the 2D mode, the gain value calculating unit 146 calculates a pixel gain value of the (N+1)th frame for each pixel based on the amount of light in the non-dimming and the amount of light in the dimming received from the light amount obtaining unit 145. More specifically, the gain value calculating unit 146 divides the amount of light in the non-dimming by the amount of light in the dimming and performs an exponential operation of $1/\gamma$ on the division result, thereby calculating the pixel gain value G.

In the 3D mode, the data modulation unit 147 multiplies the pixel gain value of the (N+4)th frame received from the gain value calculating unit 146 by the digital video data RGB(Fn+4) assigned to the (N+4)th frame, thereby performing the data modulation. In the 2D mode, the data modulation unit 147 multiplies the pixel gain value of the (N+1)th frame received from the gain value calculating unit 146 by the digital video data RGB(Fn) assigned to the (N+1)th frame, thereby performing the data modulation. The data modulation unit 147 supplies the modulated data R'G'B' to be displayed in the (N+4)th frame or the (N+1)th frame to the timing controller 11.

Figure 9:
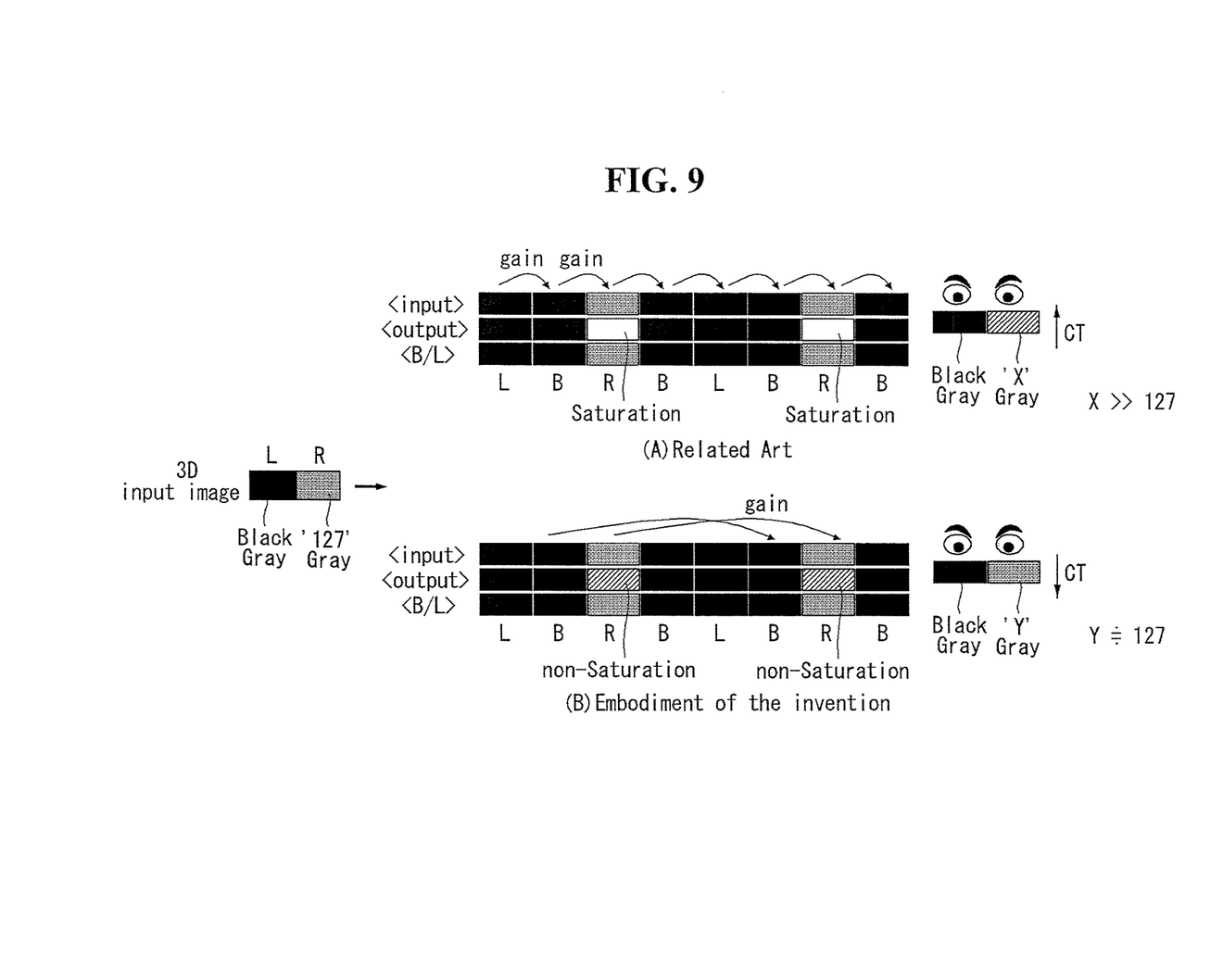
FIG. 9 illustrates the result of a comparison of an operation and an effect between a related art and an exemplary embodiment of the invention in a 3D mode.

FIG. 9 illustrates the result of a comparison of an operation and an effect between the related art and the embodiment of the invention in the 3D mode. More specifically, FIG. 9 illustrates an example of applying a local dimming technique to a 3D image including a left eye data frame L having a black gray level and a right eye data frame R having a middle gray level (for example, 127 gray levels).

In the related art, as shown in FIG. 9(A), a pixel gain value was calculated based on a dimming value obtained in the Nth frame (i.e., a black frame B), and the pixel gain value of the Nth frame was applied to the data compensation for the (N+1)th frame (i.e., a right eye data frame R) having a very low data correlation with the Nth frame. Hence, a gray level saturation was generated. As a result, a gray level represented in the right eye data frame R increased to X-gray level much greater than the middle gray level (for example, 127 gray levels) thereof, and the 3D crosstalk increased.

On the other hand, in the embodiment of the invention, as shown in FIG. 9(B), a pixel gain value is calculated based on a delayed dimming value obtained by delaying a dimming value obtained in the Nth frame (i.e., a black frame B) by three frames. The pixel gain value of the Nth frame is applied to the data compensation for the (N+4)th frame (i.e., the black frame B) having a very high data correlation with the Nth frame. In the same manner as the Nth frame, a pixel gain value is calculated based on a delayed dimming value obtained by delaying a dimming value obtained in the (N+1)th frame (i.e., a right eye data frame R) by three frames, and the pixel gain value of the (N+1)th frame is applied to the data compensation for the (N+5)th frame (i.e., the right eye data frame R) having a very high data correlation with the (N+1)th frame. Hence, the generation of gray level saturation is prevented. As a result, a gray level represented in the right eye data frame R is hold at Y-gray level similar to the middle gray level (for example, 127 gray levels) thereof, and the 3D crosstalk decreases.

Figure 10:
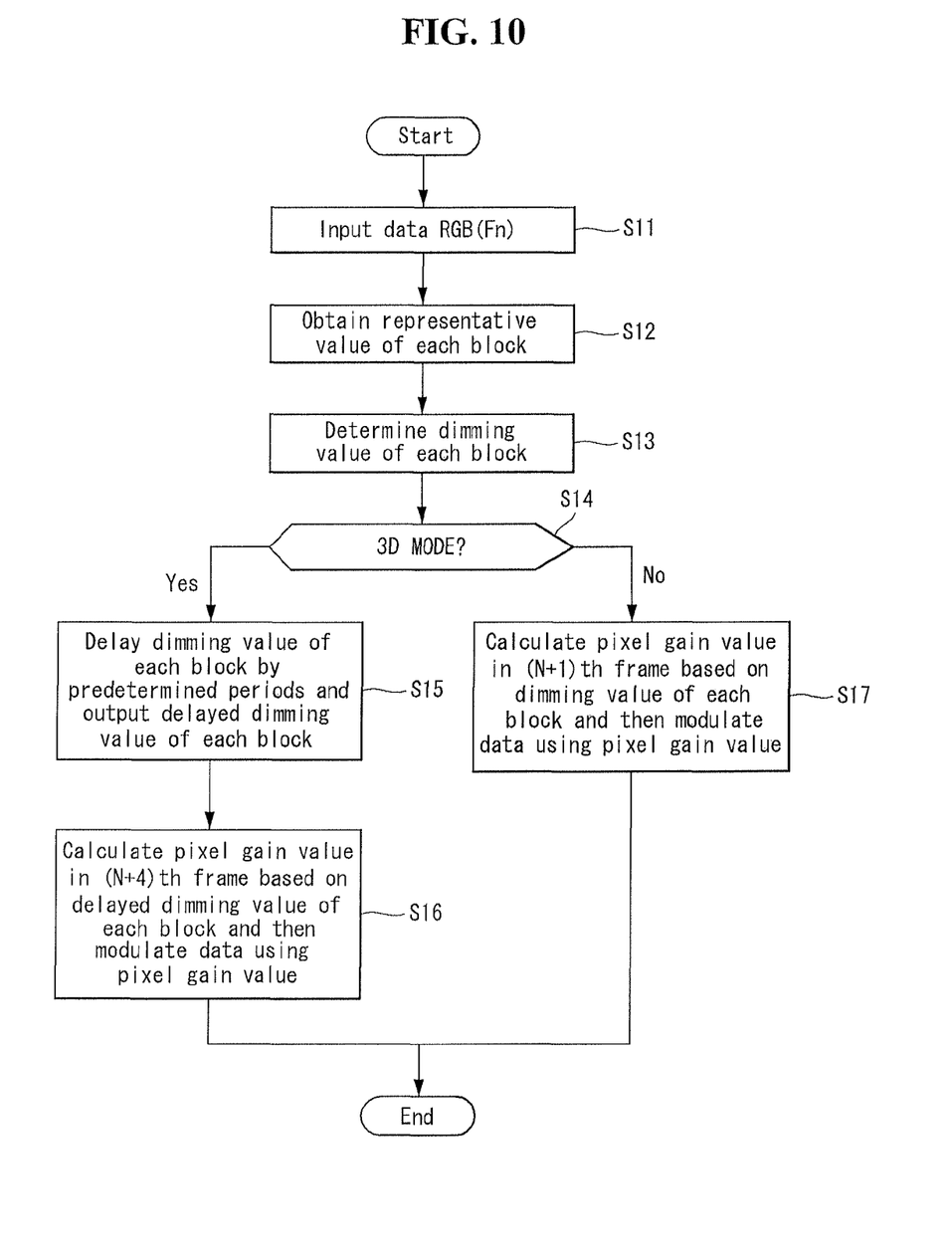
FIG. 10 sequentially illustrates each of stages in a local dimming control method of a liquid crystal display according to an exemplary embodiment of the invention.

FIG. 10 sequentially illustrates each of stages in a local dimming control method of the liquid crystal display according to the embodiment of the invention.

As shown in FIG. 10, the local dimming control method analyzes the digital video data RGB assigned to the Nth frame in each of a plurality of virtual blocks divided from the display surface of the liquid crystal display panel in a matrix form and obtains a representative value of each of the blocks in steps S11 and S12. Then, the local dimming control method maps the representative value of each block to a previously set dimming curve and determines a dimming value DIM of each block in step S13.

The local dimming control method decides whether or not a driving mode is the 3D mode in step S14.

When the driving mode is the 3D mode, the local dimming control method delays the dimming value DIM of each block by predetermined periods and outputs a delayed dimming value DIM_D of each block in step S15. If the 'LBRB' method is used to implement the 3D image, three frames may be selected as the predetermined periods. The local dimming control method obtains an amount of light (i.e., the amount of light in the non-dimming having a fixed maximum value) reaching each pixel in non-dimming and an amount of light (i.e., the amount of light in the dimming) reaching each pixel in the local dimming in the (N+4)th frame based on the delayed dimming value DIM_D of each block in step S16. Further, in step S16, the local dimming control method calculates a pixel gain value of the (N+4)th frame for each pixel based on the amount of light in the non-dimming and the amount of light in the dimming. In step S16, the local dimming control method multiplies the pixel gain value by the digital video data RGB(Fn+4) assigned to the (N+4)th frame, thereby performing the data modulation.

In step S17, when the driving mode is the 2D mode, the local dimming control method bypasses the dimming value DIM of each block without delaying periods. The local dimming control method obtains an amount of light (i.e., the amount of light in the non-dimming having a fixed maximum value) reaching each pixel in local non-dimming and an amount of light (i.e., the amount of light in the dimming) reaching each pixel in the local dimming in the (N+1)th frame based on the bypassed dimming value DIM of each block. The local dimming control method calculates a pixel gain value of the (N+1)th frame for each pixel based on the amount of light in the non-dimming and the amount of light in the dimming. The local dimming control method multiplies the pixel gain value by the digital video data RGB(Fn+1) assigned to the (N+1)th frame, thereby performing the data modulation.

As described above, in the liquid crystal display and the local dimming control method thereof according to the embodiment of the invention, the pixel gain value for the data modulation is applied at different time points depending on the input mode in consideration of the data correlation between the frames. In the 2D mode, in the same manner as the related art, the pixel gain value of the (N+1)th frame is calculated based on the dimming value of each block obtained in the Nth frame, and the pixel gain value of the (N+1)th frame is applied to the data compensation for the (N+1)th frame. On the other hand, in the 3D mode, the pixel gain value in the (N+4)th frame is calculated based on the delayed dimming value obtained by delaying the dimming value of each block obtained in the Nth frame by predetermined periods. The pixel gain value of the (N+4)th frame is applied to the data compensation for the (N+4)th frame. As a result, the liquid crystal display and the local dimming control method thereof according to the embodiment of the invention can prevent the 3D crosstalk and greatly improve the display quality when implementing the 2D image and the 3D image.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A liquid crystal display comprising:
a liquid crystal display panel configured to selectively display a 2D image and a 3D image in response to a mode signal;
a backlight unit including a plurality of light sources divided into a plurality of predetermined blocks that light the liquid crystal display panel;
a backlight driving circuit configured to individually drive the plurality of predetermined blocks based on a dimming value of each block in an Nth frame; and
a local dimming control circuit configured to
when the mode signal is a 2D mode signal, calculate a pixel gain value in an (N+1)th frame based on the dimming value of each block in the Nth frame, and apply the pixel gain value to the (N+1)th frame, and
when the mode signal is a 3D mode signal, calculate a pixel gain value in an (N+4)th frame based on the dimming value of each block in the Nth frame, and apply the pixel gain value to the (N+4)th frame, wherein N is a positive integer.

2. The liquid crystal display of claim 1, wherein the 3D image is displayed on the liquid crystal display panel in a left eye data frame, a black frame, a right eye data frame, and a black frame in the order named.

3. The liquid crystal display of claim 1, wherein the local dimming control circuit includes:
a delay unit configured to delay the dimming value of each block of the Nth frame by three frames in response to the 3D mode signal, and, wherein the dimming value of each block of the Nth frame bypasses the delay unit bypasses the delay unit in response to the 2D mode signal;
a gain value calculating unit configured to calculate the pixel gain value; and
a data modulation unit configured to multiply the pixel gain value by data of the (N+1)th frame or data of the (N+4)th frame.

4. A local dimming control method of a liquid crystal display including a liquid crystal display panel selectively displaying a 2D image and a 3D image in response to a mode signal and a backlight unit including a plurality of light sources divided into a plurality of predetermined blocks that provide light to the liquid crystal display panel, the local dimming control method comprising:
individually driving the plurality of predetermined blocks based on a dimming value of each block in an Nth frame; and
when the mode signal is a 2D mode signal, calculating a pixel gain value in an (N+1)th frame based on the dimming value of each block in the Nth frame, and applying the pixel gain value to the (N+1)th frame, and
when the mode signal is a 3D mode signal, calculating a pixel gain value in an (N+4)th frame based on a delayed dimming value of each block in the Nth frame, and applying the pixel gain value to the (N+4)th frame, wherein N is a positive integer.

5. The local dimming control method of claim 4, wherein the 3D image is displayed on the liquid crystal display panel in a left eye data frame, a black frame, a right eye data frame, and a black frame in the order named.

6. The local dimming control method of claim 4, wherein, for the 2D mode signal, the dimming value of each block of the Nth frame bypasses a delay unit; and
for the 3D mode signal, the delay unit delays the dimming value of each block of the Nth frame, and wherein applying the pixel gain comprises multiplying the pixel gain value by data of the (N+1)th frame or data of the (N+4)th frame.

7. A liquid crystal display comprising:
a liquid crystal display panel configured to selectively display a 2D image and a 3D image in response to a mode signal;
a backlight unit including a plurality of light sources divided into a plurality of predetermined blocks that light the liquid crystal display panel;
a backlight driving circuit configured to individually drive the plurality of predetermined blocks based on a dimming value of each block in an Nth frame; and
a local dimming control circuit configured to
when the mode signal is a 2D mode signal, calculate a pixel gain value in an (N+X1)th frame based on the dimming value of each block in the Nth frame, and apply the pixel gain value to the (N+X1)th frame, and
when the mode signal is a 3D mode signal, calculate a pixel gain value in an (N+X2)th frame based on the dimming value of each block in the Nth frame, and apply the pixel gain value to the (N+X2)th frame, wherein N is a positive integer and wherein X1 and X2 are different positive integers greater than 1.

* * * * *